US006816066B2

(12) United States Patent
Miyabukuro

(10) Patent No.: US 6,816,066 B2
(45) Date of Patent: Nov. 9, 2004

(54) AUTOMOTIVE DEVICE WITH A LATERAL BLINKER

(75) Inventor: Pedro Takashi Miyabukuro, Santo André—Estado de São Paulo (BR)

(73) Assignee: Metagal Industria e Comercio LTDA, Sao Paulo (BR)

( * ) Notice: Subject to any disclaimer, the term of this patent is extended or adjusted under 35 U.S.C. 154(b) by 175 days.

(21) Appl. No.: 09/860,853

(22) Filed: May 18, 2001

(65) Prior Publication Data

US 2002/0067252 A1 Jun. 6, 2002

(30) Foreign Application Priority Data

Jun. 27, 2000 (BR) .......................................... 8001294 U

(51) Int. Cl.$^7$ ................................................ B60Q 1/22
(52) U.S. Cl. ...................... 340/463; 340/465; 340/468; 340/475; 362/494; 362/545; 362/800
(58) Field of Search ............................... 340/425.5, 431, 340/463, 465, 468, 470, 475, 331, 332; 362/492, 494, 543, 544, 545, 800

(56) References Cited

U.S. PATENT DOCUMENTS 6,264,353 B1 * 7/2001 Caraher et al. ............. 362/494

* cited by examiner

Primary Examiner—Daryl Pope
(74) Attorney, Agent, or Firm—Michael J. Striker

(57) ABSTRACT

An automotive device attachable to a vehicle has an external rearview mirror including a mirror element and an end support attachable to a vehicle and supporting the mirror element, and a lateral blinker including a light source and a supporting element which supports the light source, the supporting element with the light source being incorporated in the external rearview mirror.

9 Claims, 3 Drawing Sheets

AUTOMOTIVE DEVICE WITH A LATERAL BLINKER

BACKGROUND OF THE INVENTION

The present invention relates to an automotive device attachable to a motor vehicle, in particular to a lateral blinker device, particularly for large size vehicles such as trucks, buses and the like.

The device for a luminous signaling, which is called a lateral blinker light is known in the art. It is usually disposed at the side of automotive vehicles, particularly of large size vehicles, to help better visualization of the vehicles. It is also known to use external rearview mirrors for vehicles of the above mentioned type. Such external rearview mirrors usually include a C-shaped support provided with upper and lower bases placed on a lateral door of the vehicle. The ends of the support are arranged in an articulated way, and a mirror is carried by a support articulately in a vertical transverse portion of the support. The mirror set is usually of a large size and projects outwardly beyond the lateral surface of the vehicle. Because of this such mirrors frequently are damaged by impacts, particularly in conditions of heavy traffic, in which the vehicles are very close to one another or because of collisions of the mirrors with close surfaces, etc. Such incidences usually happen because of a certain difficulty of evaluation of the position of the mirror with respect to the body and/or due to unfavorable illumination conditions and/or distraction of the driver, and/or other factors.

SUMMARY OF THE INVENTION

Accordingly, it is an object of the present invention to provide an automotive vehicle of the above mentioned general type which avoids the disadvantages of the prior art.

More particularly it is an object of present invention to provide a lateral blinker light, which in addition to its usual functions of signaling the side of the vehicle, also improves the signaling of the external rearview mirror of the vehicle.

It is also an object of the present invention to provide a lateral blinker light which has a simple construction, can be produced by a simple process, and has a low cost.

In keeping with these objects and with others which will become apparent hereinafter, one feature of present invention resides, briefly stated, in an automotive device which has an external rearview mirror including a mirror element, an end support attachable to a vehicle and supporting said mirror element, and a lateral blinker including a light source and a supporting element which supports said light source, said supporting element with said light source being incorporated in said external rearview mirror.

When the automotive device is designed in accordance with the present invention, it eliminates the disadvantages of the prior art and provides for the above mentioned highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
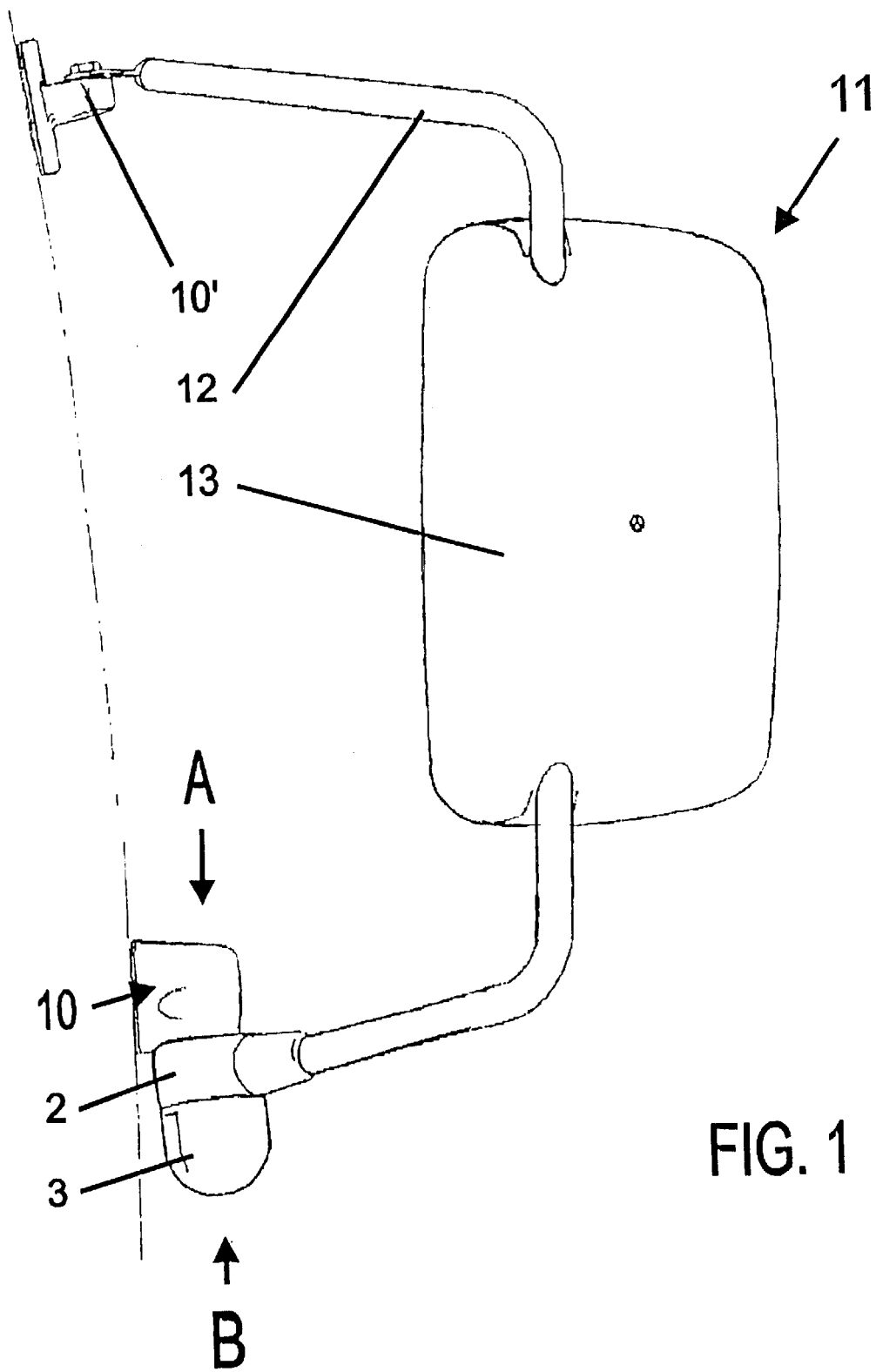
FIG. 1 is a view showing an automotive device which includes a lateral blinker incorporated in a base of an external rearview mirror.
Figure 2:
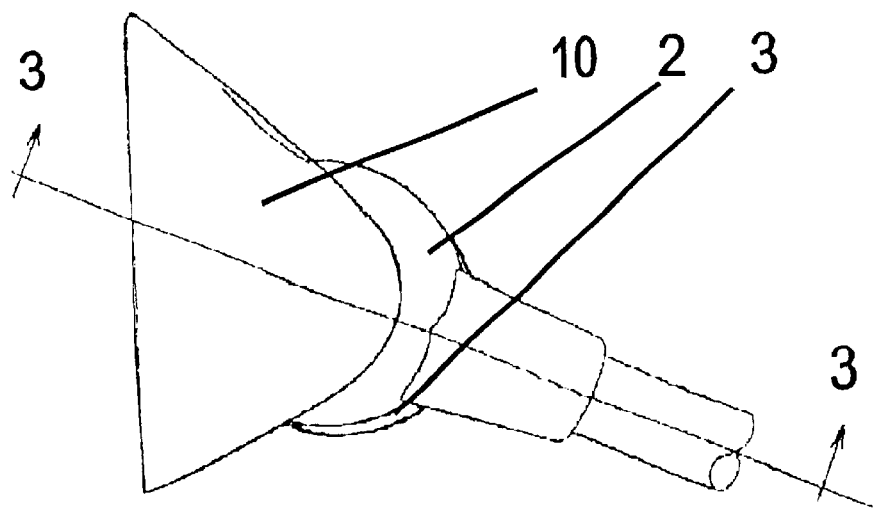
FIGS. 2 and 3 are views showing an external rearview mirror from, as seen in directions A and B.
Figure 3:
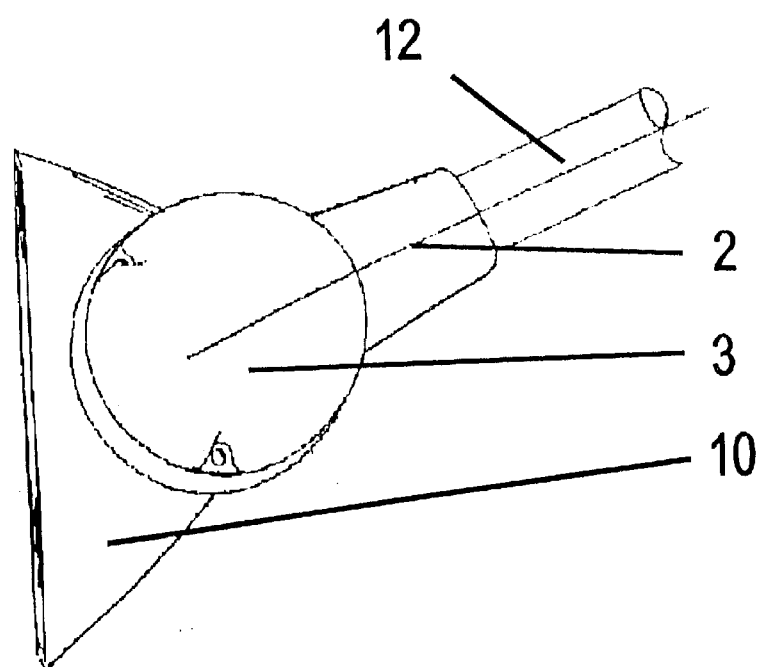
Figure 4:
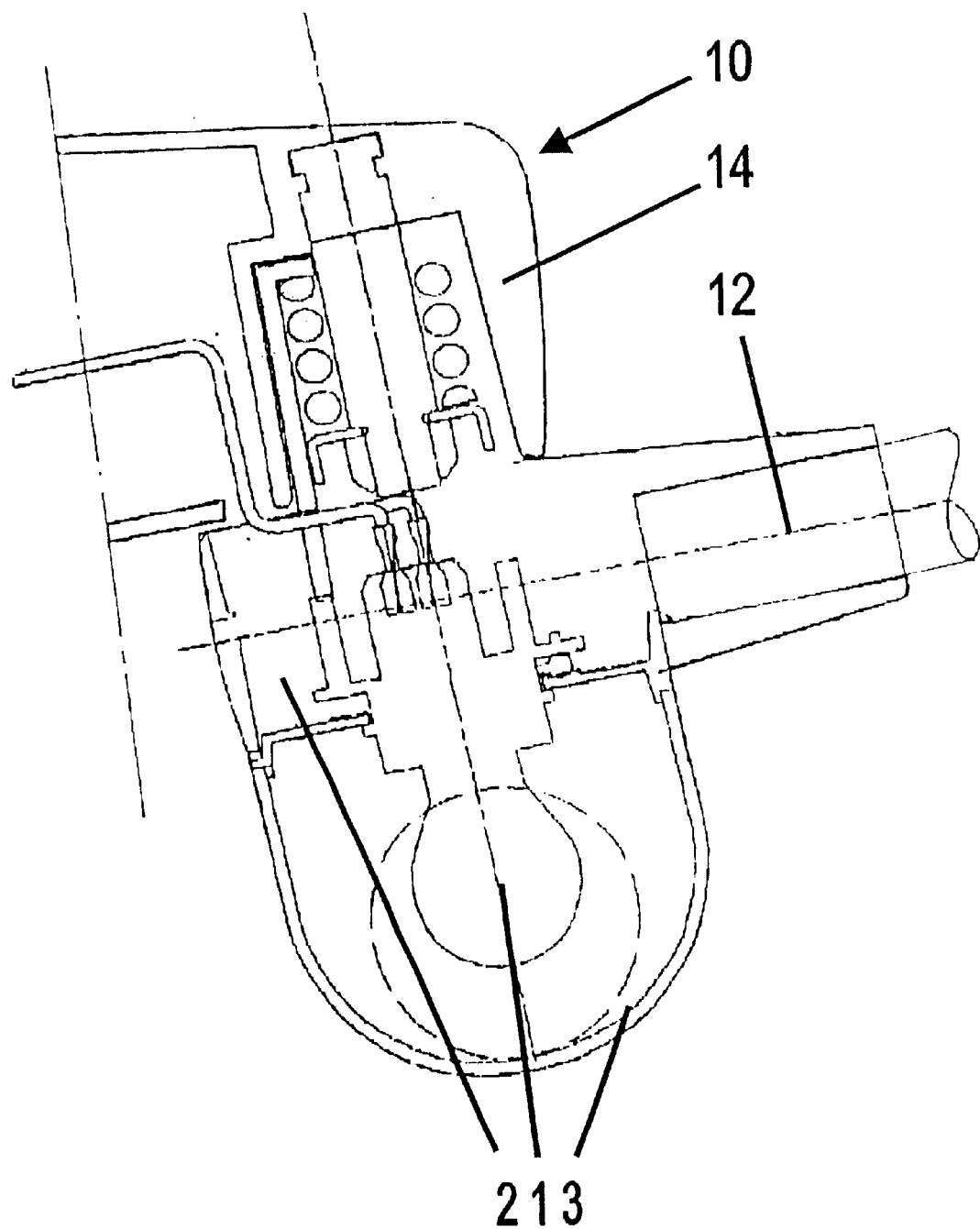
FIG. 4 is a view showing a longitudinal section of the automotive device in accordance with the present invention.

An automotive device in accordance with the present invention has a lateral blinker which includes a light source such as a bulb identified with reference numeral 1, a supporting element identified with reference numeral 2, and a lens identified with reference numeral 3. In operation of the lateral blinker, light emitted by the bulb 1, which is disposed vertically and turned downwards, passes through the lens 3 to provide a corresponding illumination.

The automotive device of the invention further has an external rearview mirror which is identified as a whole with reference numeral 11 and has an upper base 10', a lower base 10, a C-shaped supporting element 12 connected to the bases 10, 10' and a mirror element 13 supported by the supporting element 12. The upper and lower basis 10, 10' are fixed to a vehicle, in particular to a door of the automotive vehicle. The free ends of the supporting element 12 are fixed in the bases 10, 10' in an articulated manner. The mirror element 13 can be also fixed in the supporting element 12 in an articulated manner.

As can be seen from the drawings, the lateral blinker is incorporated in the external rearview mirror. The supporting element 2 of the lateral blinker incorporates a socket which holds the bulb 1 and has a lateral portion which is connected with the end of the supporting element 12 of the external rearview mirror. The supporting element 2 also has an upper part which is fixed in the lower base 10 of the external rearview mirror. The lens 3 of the lateral blinker is formed as a socket which covers the bulb and is fixed by the socket in the supporting element 2.

The lower base 10 of the external rearview mirror has an inner empty part 14, in which the upper part of the support 2 is fixed. Spring and washer set is located also in the empty part 14, so that the spring acts through the washer on the upper part of the supporting element 2. The lower base 10 has a lateral part which is fixable to the vehicle. A wire of an electric supply to the bulb 1 extends through the lateral part.

In accordance with another embodiment of the present invention, the lateral blinker can be arranged in the external rearview mirror in an adjustable manner. The vehicle structure and the support element, in addition to the incorporating of the socket for the bulb and the lens, also has a brace which is fixable horizontally in a lower section of the support 2 which in turn is fixed in a radial expansion of the lower base 10.

It will be understood that each of the elements described above, or two or more together, may also find a useful application in other types of constructions differing from the types described above.

While the invention has been illustrated and described as embodied in device in a lateral blinker, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An automobile device attachable to a vehicle, comprising an external rearview mirror including a mirror element end an end support attachable to a vehicle and supporting said mirror element, said end support having a lower base disposable proximate to a door of the vehicle and also having an upper base; a lateral blinker including a light source and a supporting element which supports said light source, said light source of said lateral blinker being disposed in said lower base of said support of said external rearview mirror, away from an external side of said external rearview mirror so that said light source with said supporting element is integrated in said external rearview mirror.

2. An automotive device as defined in claim 1, wherein said support of said external rearview mirror has a connecting element which connect said upper base and said lower base with one another.

3. An automotive device as defined in claim 2, wherein said connecting element of said support of said external rearview mirror is C-shaped and has opposite free ends provided with said bases.

4. An automotive device as defined in claim 1, wherein said lateral blinker has a lens which covers said bulb and is fixed by insertion of said supporting element.

5. An automotive device as defined in claim 1, wherein said lower base has a hollow part, said supporting element of said lateral blinker having an upper part inserted in said hollow part.

6. An automotive device as defined in claim 5, and further comprising spring means located in said hollow part of said lower base and cooperating with said upper part of said supporting element.

7. An automotive device as defined in claim 3, wherein said lower base has a radial lateral part fixable to a vehicle and receiving a wire of an electrical supply to said light source.

8. An automotive device as defined in claim 1, wherein said lateral blinker is assembled in said external rearview mirror adjustably; and further comprising adjusting means for adjusting a position of said lateral blinker and said external rearview mirror.

9. An automotive device as defined in claim 8, wherein said adjusting means include a brace which is fixed in a portion of said support of said external rearview mirror.

* * * * *